United States Patent [19]
Lange

[11] 3,938,168
[45] Feb. 10, 1976

[54] HIGH SPEED CAMERA SHUTTER

[75] Inventor: Karl-Heinz Lange, Bunde, Germany

[73] Assignee: Balda-Werke, Bunde, Germany

[22] Filed: Sept. 20, 1974

[21] Appl. No.: 507,914

[30] Foreign Application Priority Data
Feb. 25, 1974 Germany............................ 2408932

[52] U.S. Cl. .............................. 354/247; 354/266
[51] Int. Cl.² .......................................... G03B 9/40
[58] Field of Search .......................... 354/246–247, 354/266

[56] References Cited
UNITED STATES PATENTS

| | | | |
|---|---|---|---|
| 674,525 | 5/1901 | Turner et al. | 354/247 |
| 1,032,297 | 7/1912 | Richard | 354/247 |
| 3,769,893 | 11/1973 | Douglas | 354/247 X |
| 3,824,607 | 7/1974 | Tanaka | 354/247 X |

Primary Examiner—L. T. Hix
Assistant Examiner—James LaBarre
Attorney, Agent, or Firm—Blum, Moscovitz, Friedman & Kaplan

[57] ABSTRACT

A camera is provided with a camera shutter including two substantially planar plates longitudinally arranged and set in tandem. The plates are provided with exposure clearances and are longitudinally movable into successive overlying positions for aligning the exposure clearances thereof. Means are provided whereby the plates are longitudinally displaced by a rocker lever, the plates being respectively pivotally connected to opposed arms of the rocker lever for displacement, respectively, thereof.

11 Claims, 7 Drawing Figures

HIGH SPEED CAMERA SHUTTER

BACKGROUND OF THE INVENTION

This invention relates to a camera shutter, and more particularly to a novel camera shutter for a unitary lens casing.

Prior devices of the general construction of the invention operate satisfactorily when cooperatively connected to a diaphragm adjusting means, but none have heretofore been satisfactorily employed in unitary lens casing type cameras. When these prior devices have been employed without diaphragm adjusting means, excessive friction has been promoted during shuttering with a concomitant reduction of shuttering speed. The excessive frictional force promoted by these prior devices, it has been found, develops over a relatively small surface area thereby causing abrasion. To minimize abrasion it has been necessary to fabricate the parts from a hard metal thereby limiting the choice of materials for constructing the device. These prior devices are moreover bulky and unsuitable for miniaturization.

Accordingly, the instant invention overcomes the disadvantages of these prior constructions. The instant shutter is, moreover, compact and may be fabricated of lightweight materials, such as suitable plastics.

SUMMARY OF THE INVENTION

Generally speaking, in accordance with the invention, a camera shutter is provided comprising two substantially planar plates longitudinally arranged, and set in tandem. The plates are provided with exposure clearances and are longitudinally movable into successive overlying positions for aligning the exposure clearances thereof. A mean is provided whereby the plates are longitudinally displaced by a rocker lever, the plates being respectively pivotally connected to opposed arms of the rocker lever for displacement, respectively, thereof. A guide means is provided in the lens casing, the shutter plates being respectively longitudinally displaceable along the guide means. Each shutter plate is slidably mounted in a respective guide of the guide for relative longitudinal displacement therein.

In a preferred shutter embodiment, each plate thereof is longitudinally slidable in a respective guide therefor at two discrete contact portions thereof having minimum surface area.

In another preferred embodiment, the rocker lever is arranged so as to be pivotable for the full extension of the objective casing. In yet another preferred embodiment of the invention, the rocker lever is arranged so that the rocking angle thereof is variably adjustable. In still another preferred embodiment the rocker lever is provided with arms of different relative lengths for orienting the shutter plates substantially equidistant from the optical axis of the objective at different degrees of tilting for the rocker lever.

Accordingly, it is an object of the invention to provide a novel shutter for a camera.

Another object of the invention is to provide an improved camera shutter particularly adapted to unitary lens casing type cameras.

A further object of the invention is to provide a novel diaphragm shutter for a unitary lens casing type camera by providing a rocker lever with a variably adjustable rocking angle.

Yet another object of the invention is to provide a camera shutter which is operable without substantial abrasion to the parts thereof and is suited for miniaturization.

Still other objects and advantages of the invention will in part be obvious and will in part be apparent from the specification.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

Figure 4:
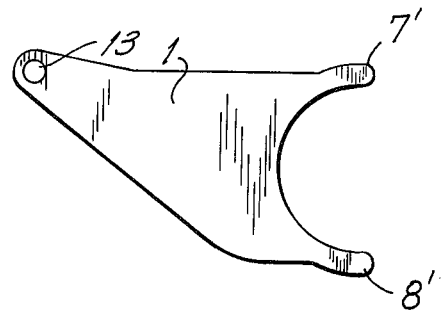
FIG. 4 is a detail view of a shutter plate constructed according to the invention.
Figure 5:
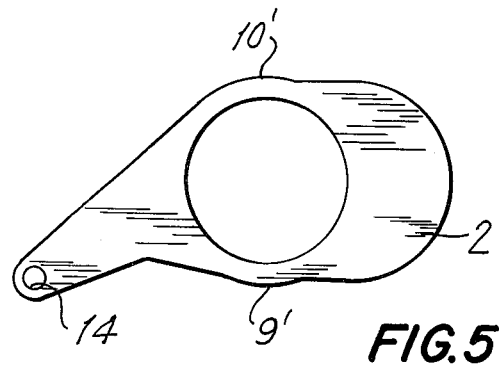
FIG. 5 is a detail view of another shutter plate constructed according to the invention.

Referring now to the FIGS. slidably mounted in a lens casing 27 having optically aligned lenses 26 mounted therein are a pair of shutter plates 1 and 2. As best seen in FIGS. 4 and 5, each shutter plate is asymmetric. Shutter plate 1 includes an upturned nose portion having an aperture 13 therein, the nose portion descending into a body portion which temrinates in a pair of substantially stunted legs 7' and 8'. Defined between the body portion of shutter plate 1 and the ledgs 7' and 8' thereof is a substantially semicircular recess which provides an exposure clearance area, as hereinafter discussed in detail. Legs 7' and 8' of shutter plate 1 extend laterally somewhat beyond the body portion thereof and the arcuate exterior perimeter of each leg provides a slidable contact which is respectively slidably mounted in a groove 7 and 8 formed in lens casing 27 for longitudinal sliding movement of shutter plate 1 in a manner hereinafter described.

Shutter plate 2 includes a down-turned nose portion having an aperture 14 therein which ascends into an expanded body portion terminating in a rounded trunk portion. Within the expanded body portion is a circular aperture which provides an exposure clearance. Opposed points 9' and 10' on the perimeter of the expanded body portion of shutter plate 2 provide slidable contacts which are respectively slidably connected in respective grooves 9 and 10 provided in casing 27 for longitudinal sliding movement of shutter plate 2 in casing 27 in the manner hereinafter described.

Figure 1:
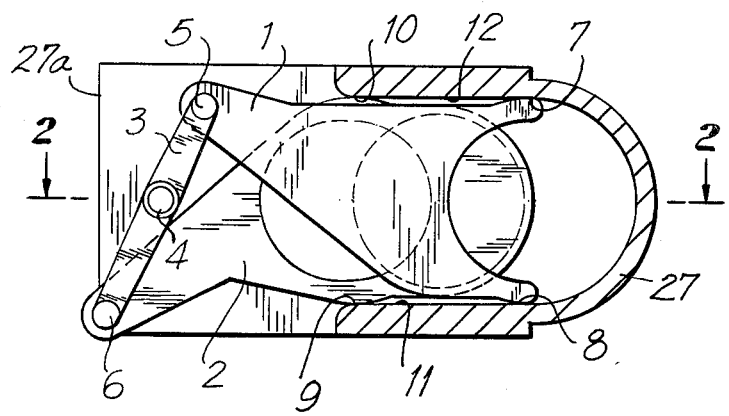
FIG. 1 is a vertical sectional view through a lens casing provided with a shutter constructed in accordance with the present invention.
Figure 2:
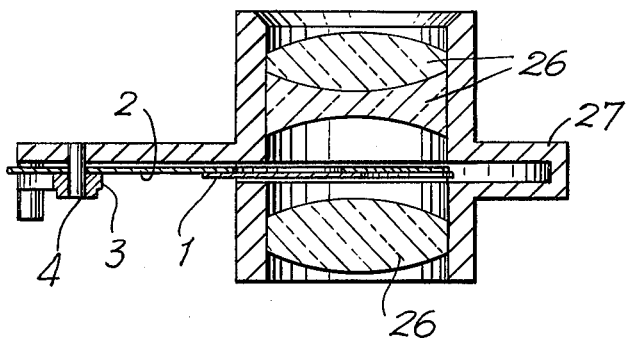
FIG. 2 is a sectional view taken along line 2—2 of the embodiment shown in FIG. 1.
Figure 3:
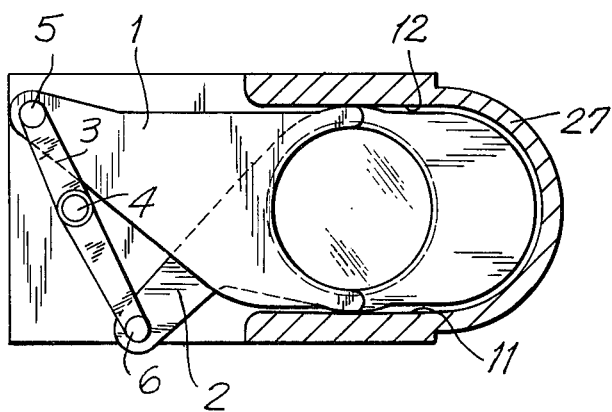
FIG. 3 is a sectional view of the embodiment shown in FIG. 1 showing the shutter thereof in an open position.

Respective sets of grooves 7, 8 and 9, 10 provided in casing 27 are substantially parallel and in spaced relationship, from the other. As best seen in FIGS. 1 – 3, shutter plates 1 and 2 respectively overlie one another in their slidable mountings in casing 27. Respective apertured nose portions of shutter plates 1 and 2 are pivotally connected to opposed arms of a rocker lever 3 by a respective pair of pins 5 and 6 connected to rocker lever 3 and extending laterally therefrom into apertures 13 and 14, respectively provided in shutter plates 1 and 2. Rocker lever 3 is pivotally connected to member 27a of casing 27 by a trunnion 4 which is fixedly connected to casing member 27a and rocker lever 3 journals thereon.

Preferably, the arms of rocker lever 3 are of unequal length, the arm thereof pivotally connected to shutter plate 2 being longer than the arm pivotally connected to shutter plate 1. The purpose therefor is to compensate for the fact that the exposure clearance area defined in the respective plates is not always aligned, one with the other, as the shutter plates are sliding in their respective grooves. It is found that by lengthening the rocker lever arm pivotally connected to shutter plate 2, the maximum non-alignment of respective exposure clearance areas occurs during the final stage as the shutter is opened. Concomitantly, maximum alignment occurs during the initial phase and overlap only starts to occur after the exposure clearance area is optimal and the relative overlap is therefore slight. Shutter plate 2, of course, reaches its fully opened position slightly in front of shutter plate 1 and moves off center as shutter plate 1 is centered and therefore the aperture provided in shutter plate 2 is preferably elongated.

Figure 6:
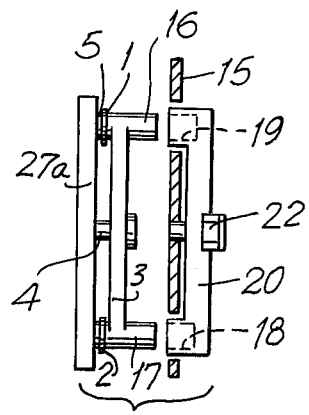
FIG. 6 is an exploded side elevational view of a means for actuating the rocker lever for longitudinally displacing a pair of slidably mounted shutter plates constructed in accordance with the invent.
Figure 7:
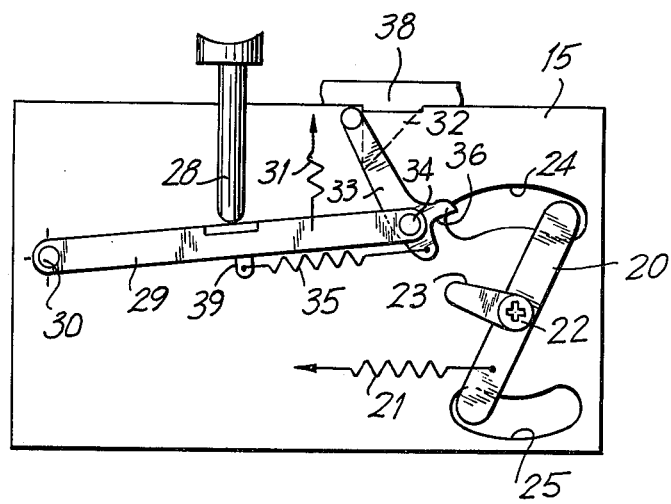
FIG. 7 is a partially schematic view of a means for actuating the rocker lever for thereby reorienting the shutter plates.

Referring particularly to FIGS. 6 and 7, a means for actuating the shutter is depicted therein. As shown in FIG. 7, the rocker lever and shutter plates are mounted on the blind side of a bearing plate 15 which provides a mounting base for the shutter actuating means, and the operative connection between the shutter actuating means and rocker lever 3 for sliding the shutter plates into and out of optical alignment with lenses 26 is best seen in FIG. 6. "Optical alignment" is defined as the position of the shutter plates when the respective exposure clearance areas thereof are substantially coaxial with lenses 26 which are fixedly mounted in casing 27.

As seen in FIG. 6, the view of the shutter and actuating means therefor are shown in exploded view. As operatively connected, rocker lever 3 is provided with a pair of substantially parallel bosses 16 and 17 on opposed ends thereof which removably connect into a respective corresponding pair of blind bores 19 and 18 provided in opposed ends of a driving lever 20. Driving lever 20 is pivotally mounted on bearing plate 15 by a stud 22 fixedly connected thereto. The pivotal axis of rocker lever 3 as defined by its journal on trunnion 4 is substantially aligned with the pivotal axis of driving lever 20 as defined by stud 22. Opposed ends of driving lever 20 are oscillatable through a respective pair of slots 24 and 25 provided in bearing plate 15. In practice, bearing plate 15 on which the actuating means is operatively mounted is substantially parallel to lens casing member 27a of casing 27 which carries the shutter members.

A release knob 28 is slidably mounted on bearing plate 15 and is operatively connectable to an oscillatable release lever 29 which is pivotally connected to bearing plate 15 by a stud 30. A centrifugal lever 33 is pivotally connected to the free end of release lever 29 by a stud 34. The lever arm of centrifugal lever 33 is biased against a latch member 32 of a tension wheel 38 which is rotatably connected to bearing plate 15. The bias is provided by a tension spring 35 which is connected at one end to the trunk of centrifugal lever 33 and at the other end thereof to a nub extension 39 provided on release lever 29. A return spring 31 connected at one end to release lever 29 and at the other end to casing 27 normally biases release lever 29 counterclockwise, as shown in FIG. 7, into its uppermost position. As release knob 28 slides downwardly for pivoting release lever 29 against the bias of spring 31, a lateral nub extension 36 provided on centrifugal lever 33 operatively engages an ejector member 23 provided on driving lever 20 for pivoting driving lever 20 counterclockwise through respective bowed slots 24 and 25 provided in bearing plate 15. A spring 21 connected at one end to the lower arm of driving lever 20 and at the other end to bearing plate 15 normally biases driving lever 20 clockwise in respective slots 24 and 25. As lateral nub extension 36 of centrifugal lever 33 pivots driving lever 20 counterclockwise against the bias of spring 21, rocker lever 3 which is releasably connected to driving lever 20 is simultaneously rotated for sliding shutter plates 1 and 2 and thereby releasing the shutter.

In the at rest position, a lateral pin extension provided on the free end of centrifugal lever 33 abuts the substantially rectilinear edge of latch 32 provided on tension wheel 38 and is biased thereagainst by spring 35. As release knob 28 is depressed downwardly against release lever 29 with sufficient force to overcome the bias of spring 31, release lever 29 rotates clockwise. Simultaneously therewith, centrifugal lever 33 is drawn downwardly along the rectilinear edge of latch member 32 until is reaches the latch vertex and once passed the latch vertex, it abuts the oblique edge of latch member 32 and is rotated clockwise by the bias of spring 35. As centrifugal lever 33 rotates clockwise, lateral nub extension 36 thereof operatively engages ejector member 23 of driving lever 20 with sufficient force to override the bias of spring 21 and rotate driving lever 20 counterclockwise through bowed slots 24 and 25. The counterclockwise rotation of driving lever 20 is transmitted to rocker lever 3 in the manner hereinbefore described in detail.

When rocker lever 3 is rotated by driving lever 20 it is driven from an initial position as shown in FIG. 1 to a final position as shown in FIG. 3. After the final position is reached, extension 36 passes beyond the arc of member 23 and the lever 20 returns immediately to start position. Lever 33 is re-cocked after knob 28 is released and tension wheel 38 is rotated to its initial position.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A high speed camera shutter comprising first and second asymmetric substantially planar shutter plates arranged in tandem, a first and second groove means corresonding respectively to said first and second shutter plates, each of said first and second shutter plates being longitudinally slidable between first and second positions in said respective first and second groove means along respective pairs of substantially opposed points of each of said first and second shutter plates, said first shutter plate having a substantially circular aperture therein for defining an exposure clearance area, said second shutter plate having a substantially semicircular recess in the perimeter thereof for concomitantly defining an exposure clearance area therein, said exposure clearance areas of said first and second shutter plates being substantially alignable for defining a shutter opening when said first and second shutter plates are respectively in their second positions, a pivotally mounted rocker lever oscillatable on its pivotal axis including first and second lever arms, said first lever arm thereof having a longer length relative to the pivotal axis of said rocker lever than said second lever arm so as to optimize said shutter opening when said first and second shutter plates are respectively in their second positions, said first shutter plate being pivotally connected to a remote end of said first rocker lever arm, said second shutter plate being pivotally connected to a corresponding remote end of said second rocker lever arm, said first and second shutter plates being longitudinally slidable in response to a pivoting movement of said rocker lever in said respective first and second groove means, and mechanical means for osciallating said rocker lever for thereby sliding said first and second shutter plates in their respective first and second groove means between their respective first and second positions thereof.

2. The high speed camera shutter as claimed in claim 1 including a lens casing for housing said high speed shutter, said first and second groove means for said respective first and second shutter plates being interiorly arranged within said casing in spaced relationship relative to each other.

3. The high speed shutter as claimed in claim 1 wherein said means for osciallating said rocker lever comprises a pivotally mounted driving lever connected to respective remote ends of said rocker lever, said driving lever having a specifically defined period of osciallation, said driving lever being oscillatable between first and second positions corresponding to said first and second positions of said shutter plates, means for normally biasing said driving lever to its first stationary position, and cooperative means for overcoming the normal bias on said driving lever for reciprocably pivoting said driving lever to its second position.

4. The high speed shutter as claimed in claim 3 wherein a boss is mounted on each remote end of said rocker lever, each boss extending oppositely relative to the position of said first and second shutter plates, said driving lever including respective first and second blind bores in remote ends thereof corresponding to said bosses provided on said rocker lever, each blind bore being arranged to receive a boss of said rocker lever, a base plate arranged between said rocker lever and said driving lever, said base plate having a pair of sector slots therein through which said respective corresponding bosses of said rocker lever may be mated in said blind bores provided in said driving lever, a journal for pivotaly mounting said driving lever on said base plate, said sector slots in said base plate determining the period of oscillation of said driving lever and said rocker lever for thereby determining the extent of longitudinal sliding movement of said shutter plates.

5. The high speed shutter as claimed in claim 4, including a driven lever having one end pivotably mounted to said base plate and a second free end, a centrifugal lever having one end pivotably connected to said free end of said driven lever and having a second free end, means normally biasing said centrifugal lever into engagement with said driving lever for thereby pivoting said driving lever to its second position, a clutch means engaging said free end of said centrifugal lever for overcoming the normal bias on said centrifugal lever, and a release member for releasing the clutch action on said centrifugal lever so as to permit the bias on said centrifugal lever to bias said centrifugal lever into cooperative engagement with said driving lever for thereby pivoting said driving lever to its second position.

6. The high speed camera shutter as claimed in claim 6, wherein said first shutter plate comprises a downturned 1, portion having an aperture therein, said nose portion ascending into an expanded body portion and said body portion terminating in a rounded trunk portion, said expanded body portion having said substantially circular aperture therein providing said exposure clearance.

7. The high speed camera shutter as claimed in claim 6 wherein said first shutter plate includes a pair of opposed parametrically arranged nubs on said expanded body portion thereof, each respective nub having a rounded peak, said first shutter plate being longitudinally slidable in said first groove means along a point of each peak of said respective nubs.

8. The high speed camera shutter as claimed in claim 1, wherein said second shutter plate comprises an upturned nose portion having an aperture therein, said nose portion descending into a body portion, said body portion terminating in a pair of substantially stunted legs, said legs and said body portion thereof defining said substantially semicircular recess therebetween for said exposure clearance.

9. The high speed camera shutter as claimed in claim 8, said stunted legs of said second shutter plate extending laterally beyond said body portion thereof, each leg including an arcuate exterior perimeter and each respective arcuate perimeter thereof including a perimeter point along which said second shutter plate is longitudinally slidable.

10. The high speed camera shutter as claimed in claim 2 including at least one lens mounted in said casing and said shutter opening being alignable therewith on an optical axis thereof.

11. The high speed camera shutter as claimed in claim 10, said first and second shutter plates being arranged in substantially parallel planes and including a pair of adjacent lenses said first and second shutter plates being located between said pair of adjacent lenses.

* * * * *